(12) United States Patent
Hanrahan et al.

(10) Patent No.: US 7,644,135 B2
(45) Date of Patent: Jan. 5, 2010

(54) METHOD OF IMPROVING COMMUNICATIONS DATA THROUGHPUT ON EMBEDDED SYSTEMS AND REDUCING THE LOAD ON THE OPERATING SYSTEM AND CENTRAL PROCESSING UNIT

(75) Inventors: Michael J. Hanrahan, Rockwall, TX (US); Denis R. Beaudoin, Rowlett, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1184 days.

(21) Appl. No.: 10/972,956

(22) Filed: Oct. 25, 2004

(65) Prior Publication Data

US 2006/0090000 A1 Apr. 27, 2006

(51) Int. Cl.
*G06F 15/16* (2006.01)
*G06F 15/173* (2006.01)
*G06F 15/177* (2006.01)

(52) U.S. Cl. .............................. 709/219; 709/238; 714/9
(58) Field of Classification Search ......... 709/236–240, 709/217–228, 0; 714/9, 11
See application file for complete search history.

(56) References Cited

U.S. PATENT DOCUMENTS

| | | | | |
|---|---|---|---|---|
| 5,909,559 A * | 6/1999 | So | .............................. | 710/307 |
| 6,105,119 A * | 8/2000 | Kerr et al. | ................... | 711/219 |
| 6,179,489 B1 * | 1/2001 | So et al. | ...................... | 718/102 |
| 6,298,370 B1 * | 10/2001 | Tang et al. | ................... | 718/102 |
| 6,629,187 B1 * | 9/2003 | Krueger et al. | ................. | 711/3 |
| 7,334,064 B2 * | 2/2008 | Davies et al. | .................. | 710/62 |
| 7,380,163 B2 * | 5/2008 | Davies et al. | .................. | 714/9 |
| 7,401,254 B2 * | 7/2008 | Davies | ......................... | 714/11 |
| 7,437,064 B2 * | 10/2008 | Seo | ............. | 396/75 |
| 7,464,205 B2 * | 12/2008 | Davies et al. | ............... | 710/100 |
| 7,464,214 B2 * | 12/2008 | Davies et al. | ............... | 710/302 |
| 2004/0226025 A1 * | 11/2004 | Beaudoin et al. | ............ | 719/321 |
| 2005/0010709 A1 * | 1/2005 | Davies et al. | ............... | 710/305 |
| 2005/0010715 A1 * | 1/2005 | Davies et al. | ............... | 711/100 |
| 2005/0010838 A1 * | 1/2005 | Davies et al. | ............... | 714/100 |
| 2005/0021605 A1 * | 1/2005 | Davies et al. | ............... | 709/203 |
| 2005/0021606 A1 * | 1/2005 | Davies et al. | ............... | 709/203 |
| 2005/0207105 A1 * | 9/2005 | Davies | ........................ | 361/683 |
| 2007/0005327 A1 * | 1/2007 | Ferris | .......................... | 703/14 |
| 2007/0008684 A1 * | 1/2007 | Anderson et al. | ........... | 361/681 |
| 2007/0040787 A1 * | 2/2007 | Saha | ........................... | 345/98 |
| 2007/0040788 A1 * | 2/2007 | Saha | ........................... | 345/98 |

* cited by examiner

*Primary Examiner*—Haresh N Patel
(74) *Attorney, Agent, or Firm*—Steven A. Shaw; W. James Brady; Frederick J. Telecky, Jr.

(57) ABSTRACT

A method is provided for dramatically improving communications data throughput on embedded systems and reducing the load on the operating system and central processing unit by moving the network protocol logic nearer to the underlying communication hardware, and utilizing the communication processor hardware abstraction layer (CPHAL) concepts. This movement of the network protocol logic allows leveraging the CPHAL data structures, which are tightly bound to the communication packets being processed. The decision making is made just above the CPHAL layer; and the CPHAL data structure is preserved. Copying data is avoided by manipulating of pointers within the CPHAL buffer.

3 Claims, 1 Drawing Sheet

METHOD OF IMPROVING COMMUNICATIONS DATA THROUGHPUT ON EMBEDDED SYSTEMS AND REDUCING THE LOAD ON THE OPERATING SYSTEM AND CENTRAL PROCESSING UNIT

BACKGROUND OF THE INVENTION

1. Field of the Invention

This invention relates generally to broadband communications systems, and more particularly to a method of routing data between broadband system product communication ports.

2. Description of the Prior Art

Operating system (OS) software, such as the Windows OS software, creates a separate software instantiation (or abstraction) of a complete system, or Virtual Machine (VM), for each application running concurrently. Each application uses and changes the state of its own virtual machine (virtual peripherals, virtual memory, etc.) independently of other tasks. Abstraction provides the OS with device independence, and device emulation delivers hardware independence.

In one known telephony system, a hardware abstraction layer (HAL) exchanges telephone signals with the external telephony devices, and interfaces directly with the underlying DSP hardware. The HAL includes basic hardware interface routines, including DSP initialization, target hardware control, codec sampling, and hardware control interface routines.

More specifically, a hardware abstraction layer interfaces with the hardware, protects applications from directly accessing the hardware and provides for improved operating system stability. A traditional hardware abstraction layer wraps an application program interface around a second task (e.g., port register settings and the like). An operating system designer need only instruct the application program interface to send some data and the application program interface then takes care of setting the correct registers, ensuring any data is in the proper place for the hardware, and the like. What the application program interface does not do is take care of any differences between different operating systems. This typically means either special coding is required for each operating system or addressing another layer that performs translation between the hardware abstraction layer and the specific operating system.

Broadband communication systems products are required to route data vary quickly between communications ports. The current technique, shown in FIG. 1, of routing this data is not meeting the higher-rate performance requirements of today's products. The communication processor hardware abstraction layer (Network Protocol Logic 10; the algorithms that decide how a data packet is to be bridged or routed) can be seen to reside in close association with the OS.

Current solutions use the data elements inherent in the operating system (OS) to process the information contained in the communication packets. This involves passing the communication data packet through several layers of software and in some cases, copying the data and then sending it to the required destination.

Accordingly, it would be advantageous if a technique could be provided for improving the rate at which data packets can be moved through a communication system. It would further be beneficial if the technique could reduce the load on the OS and its associated CPU(s) such that user-specific application could be added to the system without adversely impacting system performance.

SUMMARY OF THE INVENTION

The present invention is directed to a method of dramatically improving communications data throughput on embedded systems and reducing the load on the operating system and central processing unit by moving the network protocol logic nearer to the underlying communication hardware, and utilizing the communication processor hardware abstraction layer (CPHAL) concepts. This movement of the network protocol logic allows leveraging the CPHAL data structures, which are tightly bound to the communication packets being processed. The decision making is made just above the CPHAL layer; and the CPHAL data structure is preserved. Copying data is avoided by manipulating of pointers within the CPHAL buffer, which is easily accomplished by those skilled in the data communications software programming art.

In one aspect, a method is provided for improving communications system data throughput, dramatically in some cases, by avoiding buffer copies and by utilizing data in its raw format, thus avoiding costly CPU processing.

According to one embodiment, a method of implementing a data communications interface comprises the steps of providing communications processor hardware abstraction layer (CPHAL) network protocol logic between at least one hardware driver and desired communications system hardware; and generating data packet routing decisions via the network protocol logic layer.

According to another embodiment, a method of implementing communications system data throughput comprises the steps of providing communications processor hardware abstraction layer (CPHAL) network protocol logic between at least one hardware driver and a CPHAL layer in direct communication with desired hardware; and generating data packet routing decisions via the network protocol logic layer.

According to yet another embodiment, a method of implementing a data communications interface comprises the steps of providing a communications processor hardware abstraction layer (CPHAL) between a CPHAL network protocol logic layer and desired communications system hardware, wherein the CPHAL layer is not in direct communication with any hardware driver without first passing through the CPHAL network protocol logic layer; and generating data packet routing decisions via the CPHAL network protocol logic layer.

BRIEF DESCRIPTION OF THE DRAWINGS

Other aspects and features of the present invention and many of the attendant advantages of the present invention will be readily appreciated as the invention becomes better understood by reference to the following detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
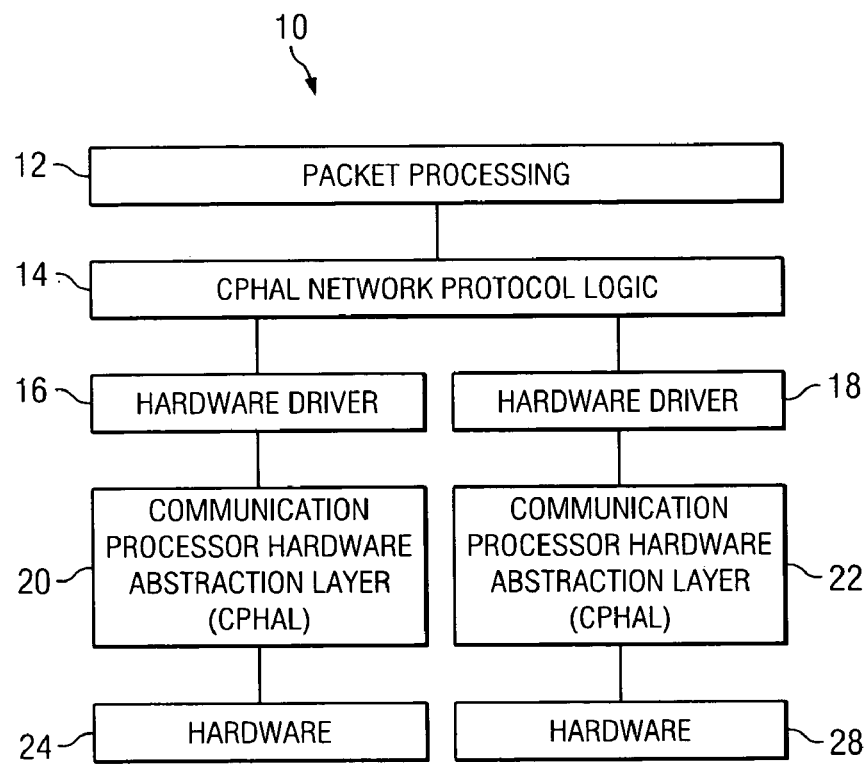
FIG. 1 is block diagram illustrating a method of routing broadband communication systems products data that is well known in the art.
Figure 2:
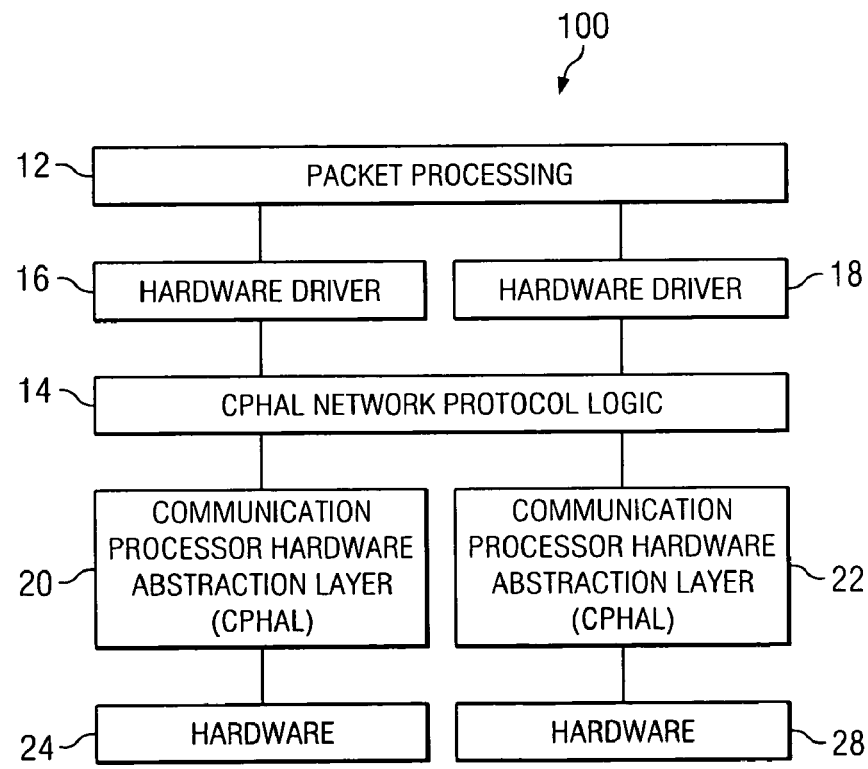
FIG. 2 is a block diagram illustrating a method of routing broadband communications systems products according to one embodiment of the present invention.

FIG. 1 is block diagram illustrating a method 10 of routing broadband communication systems products data that is well known in the art; while FIG. 2 is a block diagram illustrating a method 100 of routing broadband communications systems products according to one embodiment of the present invention. Both method 10 and method 100 can be seen to comprise packet processing firmware/software 12, network protocol logic 14, hardware drivers 16, 18, a communication processor hardware abstraction layer 20, 22 associated with each hardware driver 16, 18 respectively, and communication product hardware 24, 28.

Method 10 shown in FIG. 1 is a well known method that employs the data elements inherent in the operating system to process the information contained in the communication packets 12. This involves passing the communication data packet through several layers of software associated with the network protocol logic 14, and in some cases copying the data and then sending it to the required destination, as stated herein before.

Looking now again at FIG. 2, method 100 leverages off the communication processor hardware abstraction layer (CPHAL) 20, 22 data structures, which are tightly bound to the communication packets being processed 12. A more detailed description of a communication processor hardware abstraction layer is described in U.S. patent application Ser. No. 10/434,593, entitled Communications Processor Hardware Abstraction Layer, docket no. TI-35030, filed on May 9, 2003, and incorporated by reference in its entirety herein. The decision making now takes place just above the CPHAL layer 20, 22; and the CPHAL 20, 22 data structure is preserved. It should be noted that copying of data is avoided simply by manipulating of pointers within the CPHAL 22 buffer, which as stated herein before, can be easily implemented by those skilled in the data communications software programming art.

In summary explanation, a method of dramatically improving communications data throughput associated with embedded systems and reducing the load on the operating system and central processing unit is implemented via moving the routing decision to a point nearer the communication hardware. There is on the top layer, the packet processing layer (firmware/software) 12. Below the top or packet processing layer 12 is the hardware driver layer 16, 18. Below the hardware driver layer 16, 18 and between the hardware driver layer 16, 18 and the hardware layer 24, 28 are the CPHAL network protocol logic layer 14 and the CPHAL layer 20, 22.

The method was found by the present inventors to reduce communication system overhead and to improve communication system performance. Moving the network protocol logic layer 14 (the algorithms that decide how a data packet is to be bridged or routed) away from the operating system and nearer to the communication hardware 24, 28 was found to improve the rate at which data packets can be moved through the system, and to also reduce the load on the operating system and hence on the underlying CPU (not shown). It should be noted a significant advantage recognized by the present inventors alone, was the allowable increase in user-specific applications with no adverse system performance, due to the reduced load on the operating system.

In view of the above, it can be seen the present invention presents a significant advancement in the art of broadband communication systems. This invention has been described in considerable detail in order to provide those skilled in the broadband data transmission arts with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method of implementing communications system data throughput in a broadband communication system comprising the steps of:

providing, by a central processing unit (CPU), a logic layer configured to implement a communications processor hardware abstraction layer (CPHAL) network protocol logic between hardware drivers and CPHALs, said CPHALs are in direct communication with respective communication hardware correlated with the hardware drivers; and generating, by the CPU, data packet routing decisions via the logic layer; the decisions route data packets received over broadband communication away from an embedded operating system associated with the CPU and nearer to the communication hardware; the CPHAL is not in direct communication with the at least one hardware driver; and the logic layer is configured to facilitate all communications between the CPHALs and the respective hardware drivers.

2. The method according to claim 1, wherein the logic layer operates to provide a protocol that allows the CPHAL to pass details of its feature set and allows the CPHAL to retrieve information from a packet processing layer.

3. The method according to claim 1, wherein the CPHAL comprises algorithmic software associated with embedded operational system specific coding.

* * * * *

UNITED STATES PATENT AND TRADEMARK OFFICE
CERTIFICATE OF CORRECTION

PATENT NO. : 7,644,135 B2  Page 1 of 1
APPLICATION NO. : 10/972956
DATED : January 5, 2010
INVENTOR(S) : Hanrahan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1472 days.

Signed and Sealed this

Twenty-first Day of December, 2010

David J. Kappos
*Director of the United States Patent and Trademark Office*